April 21, 1970 S. GEORGE 3,507,385

SPINE LOCK PHONOGRAPH RECORD JACKET

Filed Aug. 8, 1968

INVENTOR
STEPHEN GEORGE
BY
ATTORNEY.

3,507,385
Patented Apr. 21, 1970

3,507,385

SPINE LOCK PHONOGRAPH RECORD JACKET

Stephen George, 241 Swinton Ave., Bronx, N.Y. 10465

Filed Aug. 8, 1968, Ser. No. 751,138
Int. Cl. B65d *27/00, 85/30*
U.S. Cl. 206—62 7 Claims

ABSTRACT OF THE DISCLOSURE

A record jacket for protectively and securely gripping a disc type phonograph record for storage in which the jacket is formed of the conventional square open-ended envelope type. In order to insure retention of the record within the jacket and prevent inadvertent slippage of the record from the jacket, an elongate spine spring clamp is arranged over the closed spine edge of the jacket thereby imparting a gripping action to the inside walls of the jacket with respect to the inner end of the record within the jacket.

BACKGROUND OF THE INVENTION

This invention relates to the art of record jackets, and more particularly to an improved record jacket implementing the retention of a record therein.

Disc type phonograph records are generally distributed in a record jacket in the form of an open-ended square envelope dimensioned to accommodate the record within the jacket. These jackets are generally fabricated of cardboard, or the like paper board stock and are printed or covered with a paper wrapper imprinted with desired promotional and informative indicia. The interior of the jacket envelope is relatively smooth, and facilitates the ready removal of the record from the jacket for playing, and insertion into the jacket for distribution and storage.

During movement of the record containing jacket, the record shifts within the jacket and the relative rubbing between the interior of the record jacket and the surface of the record is not only physically damaging to the record grooves, but also serves to generate a static electric charge on the record surface acting to attract dust particles into the record jacket and onto the record surface. In order to minimize the relative rubbing between the interior of the record jacket and the record surface, the records have first been inserted into an auxiliary paper or plastic envelope or sleeve, before insertion into the record jacket, with a resultant increase in packaging costs, and an increase in the manipulative steps required to remove the record for playing, and reinsert same for storage.

Notwithstanding the use of these auxiliary envelopes or sleeves, it is found that the record is still subject to damage as a result of shifting of this auxiliary sleeve within the jacket, and from shock damage as when the jacket is dropped or inadvertently hit. Additionally, one of the major problems encountered in connection with the use of record jackets for storing records resides in the fact that the dimensioning of the record jacket, which must of necessity be such as to freely accommodate the record for insertion into the jacket, is such as to permit the record to fall from the jacket in the event that the record jacket with the record is picked up with the open end of the jacket facing downwardly.

It is a common failing of most record jackets now in use that as a result of jacket wear or improper insertion of the phonograph record into the jacket, the edge of the record will knife through the spine edge of the jacket, destroying its usefulness as a protective enclosure.

Further, most paperboard jackets currently in use are flexible and easily bent and do not adequately protect the record from any bending or twisting forces to which the jacket is subjected during handling or improper storage.

Record jackets are usually stored on edge in a vertical position with the mouth of the jacket either facing inwardly or upwardly to avoid accidental slippage of the record from the jacket. In this position, the mouth of the jacket is exposed to dust collection.

Further, most phonograph jackets currently manufactured do not provide title identification and informative indicia on the spine edge of the jacket because of the difficult manufacturing techniques required to insure proper registration of this information along the thin spine edge.

SUMMARY OF THE INVENTION

It is with the above problems and considerations in mind that the present improved record jacket has been evolved in which a protective record jacket is provided with means to retain the record in the jacket once the record is there positioned, without requiring the use of auxiliary envelopes, thereby minimizing the manipulative steps required to effectively protect the record during storage, and permitting the application of identifying indicia to the jacket spine, and orienting the spine for ready viewing.

It is accordingly, among the primary objects of this invention to provide an improved record jacket with means preventing accidental slippage of the record from the jacket.

A further object of the invention is to provide a record jacket in which slippage of the record within the jacket is minimized after it has once been inserted to thereby prevent damage to the record surface.

Another important object of the invention is to provide a record jacket serving to retain the record in protected position without requiring the use of auxiliary envelopes.

A further object of the invention is to provide a means for bracing and stiffening the record jacket so that it may better protect the record from any bending or twisting forces to which the jacket is subjected during handling or storage.

It is also an object of the invention to provide means for reinforcing the spine edge of the record jacket so as to prevent the edge of the phonograph record from knifing through the spine of the jacket as a result of jacket wear, or inadvertently forceful insertion of the record into the jacket.

Another object of this invention is to provide a record jacket which may be stored in a vertical plane with its open end down without the record falling out of the jacket, and minimizing dust entry into the jacket.

It is also an object of this invention to provide means implementing the provision of title information and informative indicia on the spine edge of the jacket.

These and other objects of the invention which will become hereafter apparent, are achieved by forming a record jacket having an elongate spine spring clamp arranged along the spine edge of the jacket, thereby imparting a gripping action to the inside walls of the jacket which hold the record securely in place. The record jacket is formed of a conventional square open-ended envelope configuration, with the dimensions of the square being such as to accommodate the conventional circular disc type phonograph record permitting its free insertion and removal from the envelope.

A feature of the invention resides in the fact that the rigid plastic spine clamp reinforces and stiffens the entire jacket providing a flat, rigid protective envelope that protects the record from warpage caused by improper storage or handling of the jacket.

Another feature of the invention resides in the fact that the jacket may be formed from a single sheet of paperboard serving to securely engage the record within the jacket, and as a result of which the conventionally employed auxiliary envelopes or sleeves need no longer be provided or used.

BRIEF DESCRIPTION OF THE DRAWINGS

The specific details of a preferred embodiment of the invention and their mode of functioning will be made most manifest, and particularly pointed out in clear concise and exact terms in conjunction with the accompanying drawings, wherein.

DESCRIPTION OF A PREFERRED EMBODIMENT OF THE INVENTION

Referring now more particularly to the drawings, like numerals in the various figures will be employed to designate like parts.

Figure 2:
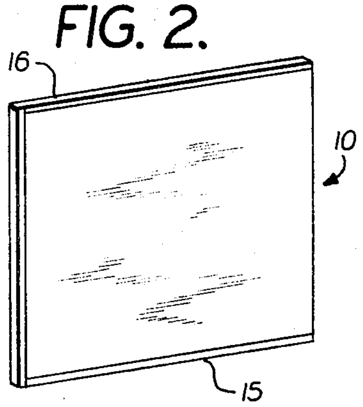
FIG. 2 is a perspective view of an assembled record jacket made in accordance with the teachings of this invention.
Figure 3:
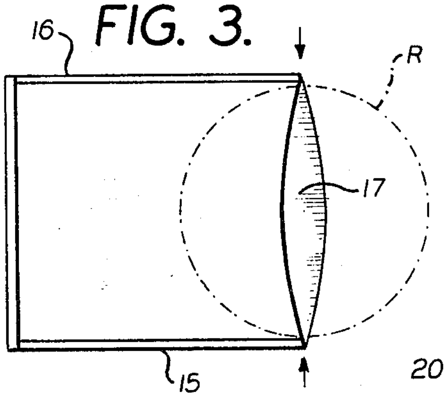
FIG. 3 is a perspective view illustrating how the open end or mouth of the jacket is bowed to permit easy insertion of the record therein.
Figure 4:
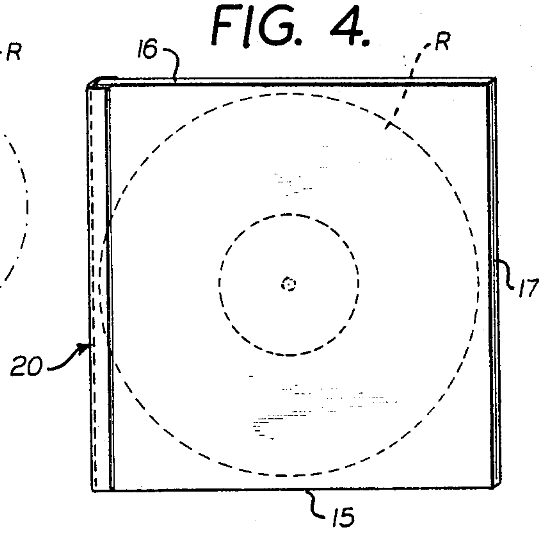
FIG. 4 is a perspective view of an assembled record jacket illustrating how the spine spring clamp is affixed to the spine edge of the jacket and how it grips the inner end of the phonograph record within the jacket.

The novel protective record jacket 10, made in accordance with the teachings of this invention, is shown in assembled relationship in FIGS. 2 and 3.

Figure 1:
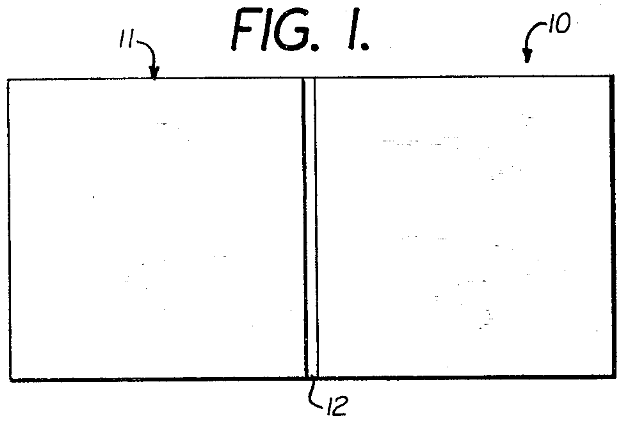
FIG. 1 is a plan view of a record jacket blank shown open to indicate the score line along which the blank is folded to form the jacket enclosure.

In the illustrated preferred embodiment, the record jacket 10 is formed of a rectangular blank of sheet material 11, as seen in FIG. 1, having a width slightly larger than the diameter of the record to be enclosed, and a length slightly greater than twice the diameter of the record. In a commercial embodiment, in producing a jacket for use in connection with twelve inch records, the length of the blank of sheet material will be 24 and ⅞ inches, and the width 12 and ⅜ inches. The sheet material may be any one of a wide variety of coated and uncoated sheet materials, including paper lined chip board, kraft and sulphate board. A .028 caliber white sulphate board has been satisfactorily employed in connection with the commercial embodiment. A spine forming center fold 12 formed by a ⅛ inch wide score line is provided at the center of the rectangle blank.

In assembling a preferred embodiment of the invention as illustrated, the blank 11, is folded over on itself along score line 12 to bring the interior surfaces into the abutting relationship and orientation shown in FIG. 2. The edges of the folded over blank extending from the spine formed by score line 12 are secured together preferably by the use of tapes 15 and 16. As will be understood by those skilled in the art, a variety of different tapes may be employed within the scope of the invention. The open end of the jacket forms mouth 17, as shown in FIG. 3 of a dimension sufficient to accommodate the record R.

Figure 6:
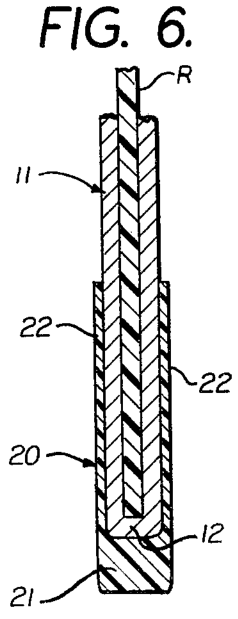
FIG. 6 is a cross sectional view of the jacket spine area showing the closed position of the spine spring clamp compressing the side walls of the jacket against the phonograph record firmly gripping it and preventing it from moving about inside the jacket or falling from the jacket even when the mouth of the jacket is facing downward.
Figure 7:
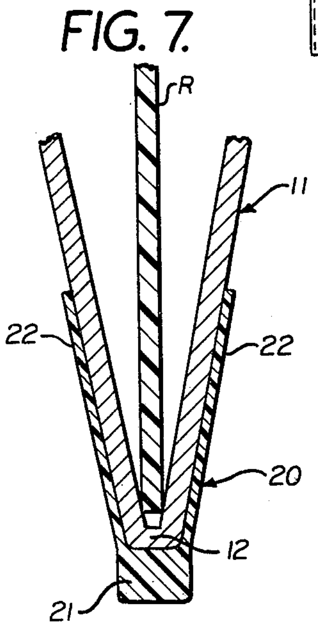
FIG. 7 is a cross sectional view of the jacket spine area showing the open position of the spine spring clamp when the side walls of the jacket are bowed.
Figure 5:
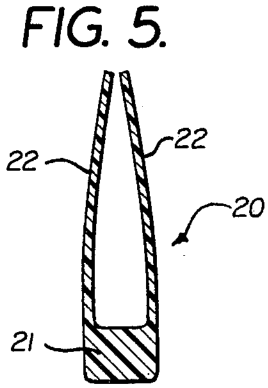
FIG. 5 is a cross sectional view of the spine spring clamp at it appears before it is affixed to the spine edge of the record jacket.

A spine spring clamp 20 as shown in FIGS. 5–7 is formed preferably as an extrusion of any of a variety of plastic materials such as polystyrene, vinyl, polyvinyl chloride, nylon, rubbers, butadienes, or the like. It will of course be apparent to those skilled in the art that a large variety of materials including plastics, metals, and compositions may be employed. The requirement of the material being that it preferably be subject to being formed with flanges 22 adapted to resiliently engage the record jacket sides forced therebetween. Spine clamp 20 is preferably formed with an elongate body portion 21 of a length substantially equal to the length of the spine edge of the record jacket 10. It is preferred that the cross-section of the body portion 21 be of a rectangular nature with a long dimension slightly larger than the thickness of a record jacket. Upstanding flanges 22 bowed towards each other are formed on the body 21. The length of flanges 22 (extending upward from body 21) is preferably such as to grip a record in the record jacket on which the clamp is applied. Thus, in a record jacket for a single conventional 12″ record, the clamp is dimensioned with body portion 21 of a $\frac{3}{16}$″ width and $\frac{3}{16}$″ depth, with flanges 22 extending ⅜″ from the body..

In bowing the mouth of the jacket, the side walls of the jacket serve as lever arms with respect to the flanges 22 of the spine spring clamp 20 sufficiently spreading the flanges 22 along the spine of the jacket (see FIG. 7) to permit complete record insertion. When the bow is released, the flanges 22 return to their normally compressed position (FIG. 6) causing the inside jacket walls along the spine edge of the jacket to firmly grip the record R, preventing it from moving about inside the jacket or falling from the jacket even when the mouth of the jacket is facing downward.

Removal of the record from the jacket requires the bowing of the jacket to the position illustrated in FIG. 3, which spreads the rigid spine spring clamp FIG. 7, and releases the record.

The above disclosure has been given by way of illustration and elucidation, and not by way of limitation, and it is desired to protect all embodiments of the herein disclosed inventive concept.

What is claimed is:

1. A protective record jacket for disc shaped phonograph records, said jacket comprising a pair of walls dimensioned to enclose a record therebetween, said walls being separable along one edge thereof to provide a mouth for the receipt of a record in the jacket; a clamp having a body portion extending along another edge of the jacket; and spaced flanges extending from said clamp body portion over the jacket walls to resiliently engage same exerting a force against said walls biasing them towards each other.

2. A protective record jacket as in claim 1 in which said flanges are dimensioned to extend over the walls of the jacket at least a distance such as to overlie a portion of the edge of a record positioned in the jacket.

3. A protective record jacket as in claim 1 in which said body portion is of a rectangular configuration in cross-section and is oriented with a substantially flat surface thereof perpendicular to the plane of the jacket to provide a surface on which desired indicia may be applied.

4. A protective record jacket as in claim 1 in which said walls are formed from a single sheet blank folded along a center spine forming fold; and said clamp is arranged along said spine.

5. A record jacket reinforcing and record engaging clamp comprising a body portion dimensioned to extend along a normally closed edge of a conventional rectangular record jacket; and resilient flanges extending from said body portion, said flanges being spaced apart a distance such as to accommodate a record jacket therebetween and resiliently engage same.

6. A clamp as in claim 5 in which said flanges are dimensioned to extend over the walls of the jacket in connection with which the clamp is employed at least a distance such as to overlie a portion of a record in the jacket.

7. A clamp as in claim 5 in which said body portion has a relatively flat surface remote from said flanges on which desired indicia may be applied.

References Cited

UNITED STATES PATENTS

| | | | |
|---|---|---|---|
| 2,480,416 | 8/1949 | Modes | 229—68 |
| 2,533,539 | 12/1950 | Viviam | 229—65 |

| | | | |
|---|---|---|---|
| 3,294,229 | 12/1966 | McConnel et al. | 206—57 |
| 3,132,795 | 5/1964 | Allison | 229—68 |
| 3,397,434 | 8/1968 | Arblaster | 24—255 |

WILLIAM T. DIXSON, Jr., Primary Examiner

U.S. Cl. X.R.

24—255; 229—68